April 4, 1939.   E. WALKER   2,153,356
CIRCULATING SPRAY BAR
Filed Nov. 19, 1937
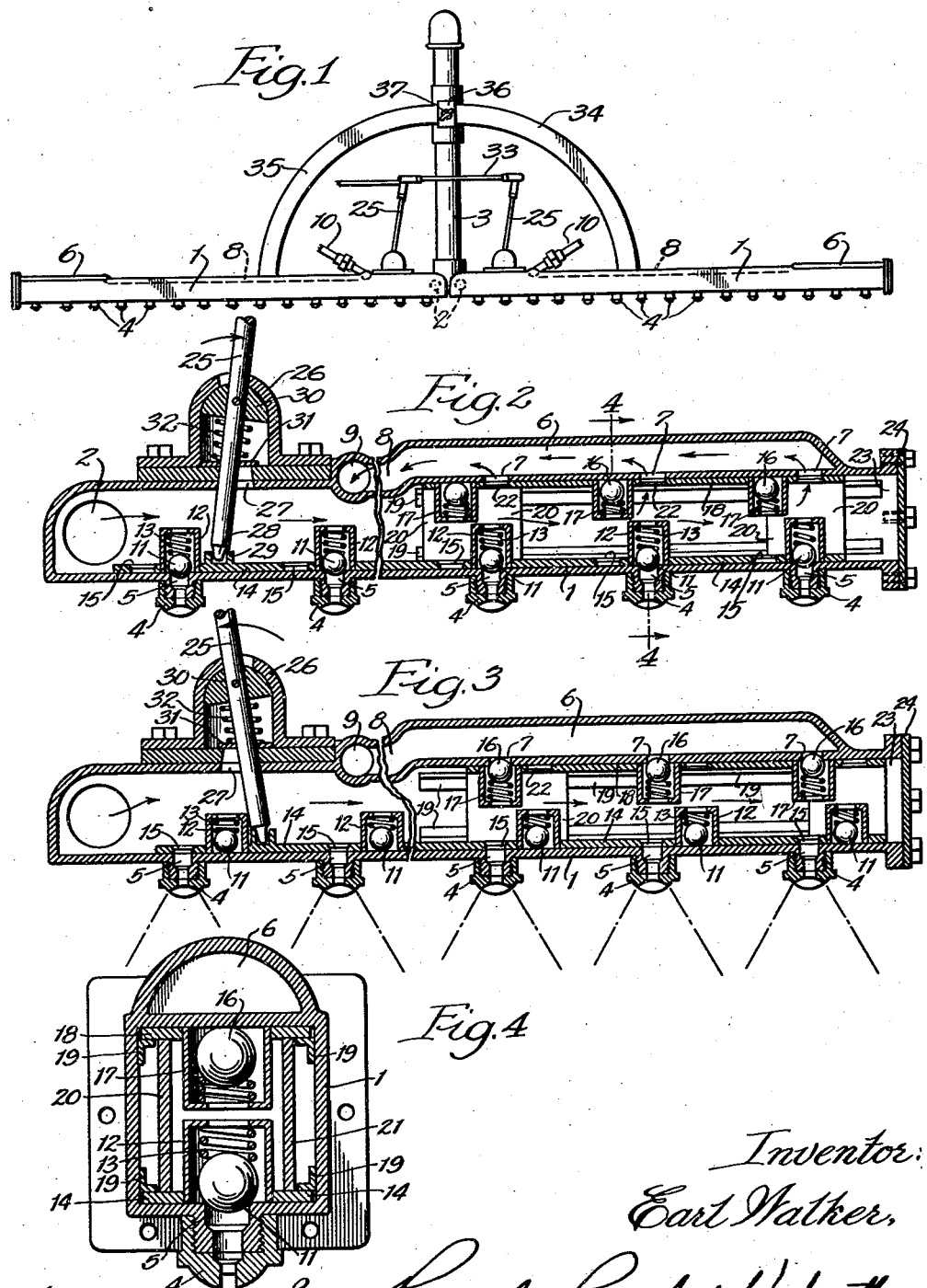
Inventor:
Earl Walker,
By Rummler, Rummler & Woodworth
his Attorneys.

Patented Apr. 4, 1939

2,153,356

UNITED STATES PATENT OFFICE 2,153,356

CIRCULATING SPRAY BAR

Earl Walker, Sullivan, Ill.

Application November 19, 1937, Serial No. 175,465

10 Claims. (Cl. 299—34)

This invention relates to improvements in spraying apparatus and particularly road-spraying devices for handling hot material and wherein a constant circulation of such material is necessary to prevent congealing of the material in the distributing system.

Recirculating distributor bars for spraying equipment and recirculating systems are, of themselves, well-known in the art, and various arrangements of valve mechanisms for simultaneous control of the spraying and recirculating operations have been employed. Practical devices of this nature are, however, of complicated and expensive design; and known arrangements of simple construction have the objection that the valve mechanism is not positive and secure in its operation, particularly with respect to preventing loss by leakage through the spray nozzles and maintaining a maximum of spray pressure during the spraying operation.

The main objects of the present invention are to provide a recirculating distributor bar combining the advantages of simplicity of construction and perfect, simultaneous valve control of both the spraying and the recirculating functions; to provide such a device wherein recirculation of the spraying material is had throughout the entire length of the distributor bar when the spray nozzles are closed off; to provide such a device in which the circulation is cut off within the distributor bar during spraying operations; to provide a simplified distributor bar construction having a self-contained arrangement for simultaneous control of both the recirculating and spraying functions and to provide an improved valve mechanism for recirculating spray bars.

A specific embodiment of this invention is shown in the accompanying drawing, in which:

Fig. 1 is a view in elevation showing the improved recirculating spray bars in spraying position.

Fig. 2 is a longitudinal vertically-sectioned view of the right-hand distributor bar of Fig. 1, showing the improved valve mechanism positioned for recirculation.

Fig. 3 is a similar view showing the valve mechanism positioned for spraying, and, Fig. 4 is a sectional view of the distributor bar as taken on line 4—4 of Fig. 2.

In the form shown in the drawing my improved spray bar 1 comprises an elongated tubular member of rectangular cross section having an inlet opening 2 at one end arranged for swivel connection with a main supply conduit 3 in a known manner which, though not herein shown, is fully illustrated in my co-pending application, Serial No. 156,148, filed July 28, 1937.

The distributor bar 1 is closed at both ends and is provided with a longitudinally-spaced series of nozzles 4 on its lower surface, each of which nozzles communicates with the interior of the spray bar 1 through a suitable opening 5 in its lower wall. These openings are controlled by a plurality of simultaneously operable valves that will be hereafter described.

To provide for recirculation of the spraying material throughout the entire length of the distributor bar 1 an enclosed recirculating chamber 6 is provided on the upper surface of the distributor bar 1 at the outermost end thereof, the chamber 6 having communication with the interior of the spray bar 1 through a plurality of openings 7 in the uppermost wall of the spray bar, which wall serves to divide or separate the recirculating chamber 6 from the interior of the spray bar 1. A conduit 8 leading from the inner end of the recirculating chamber 6 toward the end of the spray bar in which the inlet opening 2 is located is provided to connect the recirculating chamber 6 with an outlet 9 to which a flexible hose or tube 10 is connected to conduct the recirculating material back to the source of supply from which the circulation originates by way of the supply conduit 3. Thus, the material being sprayed is allowed to pass through the entire length of the distributor bar before it is returned to the source of supply, thereby assuring that there will be no pockets or dead-end spaces in which the spraying material might gather and congeal.

The valves for controlling the spray openings 5 and the recirculation ports 7 are of the type described and illustrated in my aforementioned copending application, Serial No. 156,148, and comprise a spherical or ball valve member 11 contained in a housing 12 which also contains a spring 13 disposed between the valve member and the end of the housing 12 and arranged to normally urge the spherical ball member into seating engagement with the respective valve opening.

The spherical valve 11 is loosely held within the housing 12, which in turn is mounted on a valve-actuating bar 14, which extends substantially the length of the distributor bar, whereby longitudinal shifting of the actuating bar 14 will move the housing 12 laterally with respect to the valve opening, so as to carry the valve members 11 toward or away from seating position opposite the valve openings.

In order to provide for passage of the material being sprayed into the valve openings, an aperture 15 is provided in the valve-actuating bar 14 for each of the valve openings 5, the apertures 15 being located alongside the respective valve housings 12 and spaced apart a distance equal to the spacing of the valve nozzles 4 or the valve openings 5.

Similar spherical valve members 16 are provided for each of the openings 9 leading to the recirculating chamber 6, and each of these valve members 16 is contained in a housing 17 and maintained in valve-opening engaging position by a spring 18, in the same manner as the valves before-described which control the spray nozzles.

The housings 17 are also carried on a longitudinally extending actuating member 18 which is arranged to be shiftable longitudinally in the distributor bar 1 as in the case of the valve-actuating member 14.

As shown, the valve-actuating members 14 and 18 are maintained in their proper position within the distributor bar 1 by means of angle bars or guides 19 secured to the inner side walls of the distributor bar 1 adjacent the upper and lower portions thereof, as shown in Fig. 4, the actuating members 14 and 18 sliding between the respective lower and upper walls of the distributor bar 1 and the inwardly extending legs of the angle guides 19. The valve-actuating members 14 and 18 are also connected together by means of plates 20 and 21 disposed adjacent the side walls of the spray bar 1. Thus, shifting of one of the actuating members will cause a simultaneous and similar shifting of the other of the actuating members.

As shown, passageways 22 are provided in the actuating bar 18 to provide communication between the recirculating passageways or ports 7 and the interior of the spray bar. The passageways, however, are offset longitudinally of the spray bar with respect to the passageways 15; and likewise, the valve members 11 and 16 and their respective housings 12 and 17 are offset with respect to each other, the amount of offset being such that when the valve members controlling the nozzles 4 are in position to close the same the valve members 16 controlling the recirculating ports 7 will be in their open position with the passageways 22 in registry with the ports 7.

The valve mechanism is assembled into the distributor bar through one end thereof which is provided with a flanged opening 23 closed by a cover plate 24 bolted onto the flanged portion, the valve mechanism being telescopingly fitted into the distributor bar by engaging the valve actuating plates 14 and 18 with the angle guides 19, and then sliding the mechanism into the spray bar and fitting the spherical valve members and their respective springs into each housing as the housings pass the outermost margin of the end opening 23.

As shown, the valve mechanism is actuated by a lever 25 which extends, through a self-sealing closure 26 and an opening 27 in the upper surface of the distributor bar, into the interior of the distributor bar where a rounded end 28 of the lever engages in a socket 29 fixed on the surface of the actuating bar 14.

The housing 26 is provided with a dome having a spherical inside surface and the lever 25 is pivotally mounted therein and held in place by a hemispherical retaining collar 30 fixed on the lever 25 and positioned to engage with the spherical inner surface of the housing 26 in the manner of a ball and socket joint. A shiftable closure plate 31 closely surrounding the lever 25 is arranged to close the opening 27 leading from the interior of the distributor bar to the interior of the housing 26, and the closure plate 31 is held tightly against the margins of the opening 27 by means of a compression spring 32, which surrounds the lever 25 and acts between the flat-bottom surface of the hemispherical retaining member 30 and the closure plate 31.

Thus, as the lever 25 is shifted between the positions shown in Figs. 2 and 3, the closure plate 31 will shift back and forth with the lever 25 so as to at all times cover the opening 27, the closure plate 31 being of such size as to always extend over the margins of the opening 27.

As shown in Fig. 1, when a plurality of distributor bars 1 are employed, the respective valve-actuating levers 25 may be connected by means of a detachable link 33 to provide for simultaneous operation of the several levers, or if individual operation of the levers 25 is desired, the link 33 may be disconnected or omitted.

In the arrangement shown in Fig. 1, wherein two distributor bars are employed, the distributor bars are respectively carried on quadrant members 34 and 35 which extend through a bracket 36 in which the quadrant members are slidable, the bracket 36 being provided with a set screw 37 arranged to lock the quadrant members 34 and 35 in any desired position so as to support the distributor bars in either a horizontal or angular position.

When the distributor bars are not spraying material from the nozzles 4, the valve mechanism will be in the position shown in Fig. 2 with the valve members 11 carried by the actuating member 14 in position to close the ports 5 for the nozzles 4; and the valve members 16, together with the actuating plate 18 will be positioned with the openings 22 in registry with the recirculating ports 7. With the valve mechanism in this position the spraying material entering the distributor bar through the opening 2, from the supply conduit 3, will pass through the entire length of the distributor bar and then into the recirculating chamber 6 by way of the registering openings 22 and 7, the material flowing from the chamber 6 by way of the conduit 8 to the outlet opening 9 and into the return conduit 10.

When it is desired to spray material from the nozzles 4 the lever 25 is shifted to move the valve actuating bars 14 and 18 longitudinally in the spray bar, so as to cause the valve members 11 to move laterally away from the openings 5 leading to the nozzles 4, and to bring the openings 15 in the actuating member 14 into registry with the openings 5, at the same time causing the valve members 16 to move into closed position where they engage in the ports 7 leading to the recirculating chamber 6, thus closing off recirculating while the valves controlling the spray nozzles 4 are in their open position. In this way the maximum amount of the pressure acting on the material to be sprayed will be utilized to force the material through the nozzles 4 without the loss that would otherwise be occasioned were the recirculating ports 7 left open.

When the valve actuating members 14 and 18 are shifted to cause opening or closing of the respective ports which they control, the spherical valve members are caused to roll into and out of engagement with the openings which they are intended to control through engagement of the respective valve housings with the valve members, a yielding action on the part of the valve positioning springs permitting unseating of the seated valve members. Thus, the effort required to seat and unseat the several valve members is relatively small and a quick easy action is had though a large number of valve members are simultaneously actuated.

It will be understood that in the device shown in Fig. 1 the valve mechanism of the left-hand distributor bar will be arranged to move in a direction opposite that required for the right-hand distributor bar to affect the spraying or recirculating functions, thus permitting the levers 25 to be simultaneously operated by a single link.

The main advantages of this invention reside in the simplicity of construction and low manufacturing cost obtained in recirculating spray bars wherein simultaneous valving of the spray nozzles and recirculating passages is required. Other advantages are found in the simplicity of the operation of the improved distributor bar valve mechanism and in the arrangement for sealing the openings through which the operating lever enters the distributor bar. Another advantage lies in the arrangement wherein a plurality of openings are provided at the outermost end of the distributor bar for more rapidly recirculating the spraying material when the spray nozzles are closed; and in the simple construction for simultaneously valving all of the openings leading from the interior of the distributor bar by means of a single control lever.

Although but one specific embodiment of this invention is herein shown and described, it will be understood that details of the construction shown may be altered or omitted without departing from the spirit of this invention as defined by the following claims.

I claim:

1. A distributor bar comprising a tubular member having an inlet opening adjacent one end and a plurality of recirculation ports in the side wall adjacent the other end, an enclosed longitudinally-extending chamber on said tubular member covering said recirculation ports and having connection with a discharge conduit, a plurality of longitudinally-spaced spray nozzles on said tubular member, a valve member housed within said tubular member for each of said nozzles and recirculation ports, and means within said tubular member arranged to actuate all said valve members simultaneously, the valve means for said ports being arranged to be in open position when said spray nozzles are closed and in closed position when said spray nozzles are open.

2. A distributor bar comprising an elongated tubular member having an inlet adjacent one end, an enclosed longitudinally extending chamber on the outside of said tubular member adjacent its other end and communicating with the interior of said member through a plurality of ports in the wall thereof, a conduit on said member leading from said chamber to a discharge connection, a plurality of spaced spray nozzles on said tubular member, individual valve means housed within said tubular member for each of said spray nozzles and said ports, and means within said tubular member to actuate all said valve means simultaneously, the valve means for said ports being arranged to be in open position when said spray nozzles are closed and in closed position when said nozzles are open.

3. A distributor bar comprising an elongated tubular member having an inlet opening adjacent one end and a plurality of recirculation ports in its side wall adjacent the other end, said ports communicating with an enclosed chamber formed integrally on said tubular member, and an enclosed passage in the wall of said tubular member leading from said chamber to a discharge connection located adjacent said inlet opening, said tubular member having distribution apertures spaced therealong and in communication therewith.

4. A distributor bar comprising an elongated tubular member having an inlet opening adjacent one end and a recirculation port in its side wall adjacent the other end, said port communicating with an enclosed chamber formed integrally on said tubular member and said chamber having communication with a discharge connection, a plurality of spaced spray nozzles on said tubular member each opening flush with the inner surface thereof, a spring seated spherical valve member for each of the spray nozzle openings and a like valve member for said recirculation port all disposed within said tubular member, and a longitudinally extending valve actuating member within said tubular member arranged to control all said valve members simultaneously, the valve member for said recirculation port being arranged to be in open position when said spray nozzle openings are closed and in closed position when said nozzle openings are open.

5. A distributor bar comprising an elongated tubular member having an inlet opening adjacent one end and a plurality of recirculation ports in its side wall adjacent the other end, said ports communicating with an enclosed chamber formed integrally on said tubular member and said chamber having communication with a discharge connection located adjacent said inlet opening, a plurality of spaced spray nozzles on said tubular member each opening flush with the inner surface thereof, a spring seated spherical valve member for each of the spray nozzle openings and a like valve member for said recirculation ports all disposed within said tubular member, and a longitudinally extending valve-actuating member within said tubular member arranged to control all said valve members simultaneously, the valve members for said recirculation ports being arranged to be in open position when said spray nozzle openings are closed and in closed position when said spray nozzle openings are open.

6. A distributor bar comprising an elongated tubular member having a plurality of discharge ports, individual valve means controlling said ports, a valve actuating member arranged to be longitudinally slidable to actuate said valve means simultaneously, and means to shift said actuating member comprising a lever extending through an aperture in the side wall of said tubular member and engaging said actuating member, a hollow closure for said aperture having an end opening through which said lever extends, sealing means on said lever and within said closure arranged to engage the inner margins of said end opening to close the same, a shiftable plate closely surrounding said lever and engaging the margins of said aperture within said closure, and resilient means arranged to hold said sealing means and said plate in contact with the margins of said opening and said aperture respectively.

7. A distributor bar comprising an elongated tubular member having a plurality of discharge ports, individual valve means controlling said ports, a valve actuating member arranged to be longitudinally slidable to actuate said valve means simultaneously, and means to shift said actuating member comprising a lever extending through an aperture in the side wall of said tubular member and engaging said actuating member, a hollow closure for said aperture having a dome with a spherical inside surface and an opening therein through which said lever extends, a sealing member on said lever having a spherical surface engaging the inner surface of said dome to close said opening, a shiftable plate closely surrounding said lever and engaging the margins of said aperture within said closure, and spring means acting between said sealing member and plate to hold them in contact with the margins of said opening and aperture respectively.

8. In a distributor bar having a longitudinally shiftable valve-actuating member therein, a shifting means comprising a lever extending through an aperture in the wall of said distributor bar and engaging said actuating member, a hollow dome-like closure for said aperture having a spherical inside surface and an opening therethrough alined with said aperture, a hemispherical member on said lever engaging said spherical surface, and closing said opening, a flat shiftable plate within said closure closely surrounding said lever, and engaging the margins of said aperture to close the same, and a compression spring surrounding said lever and disposed between said hemispherical member and said plate to urge said plate against the margins of said aperture.

9. A distributor bar comprising an elongated tubular member having an inlet opening adjacent one end and a recirculation port in its side wall adjacent the other end, said port communicating with an enclosed chamber on said tubular member, and an enclosed passage in the wall of said tubular member leading from said chamber to a discharge connection located adjacent said inlet opening, said tubular member having distribution apertures spaced therealong and in communication therewith.

10. A distributor bar comprising an elongated tubular member having an inlet opening adjacent one end and a recirculation port in its side wall adjacent the other end, said port communicating with an inclosed passage formed integrally with said tubular member and leading from said port to a discharge connection located adjacent said inlet opening, and a series of distribution apertures disposed throughout substantially the length of said tubular member and in communication therewith.

EARL WALKER.